United States Patent
Liu et al.

(10) Patent No.: US 8,811,759 B2
(45) Date of Patent: Aug. 19, 2014

(54) SYSTEM AND METHOD FOR EFFECTIVELY PERFORMING AN INTRA PREDICTION PROCEDURE

(75) Inventors: Wei Liu, San Jose, CA (US); Mohammad Gharavi-Alkhansari, Santa Clara, CA (US); Ehsan Maani, San Jose, CA (US)

(73) Assignee: Sony Corporation, Tokyo (JP)

( * ) Notice: Subject to any disclaimer, the term of this patent is extended or adjusted under 35 U.S.C. 154(b) by 406 days.

(21) Appl. No.: 12/930,666

(22) Filed: Jan. 13, 2011

(65) Prior Publication Data

US 2012/0183237 A1 Jul. 19, 2012

(51) Int. Cl.
G06K 9/36 (2006.01)
H04N 7/26 (2006.01)
H04N 7/34 (2006.01)

(52) U.S. Cl.
CPC ... *H04N 19/00042* (2013.01); *H04N 19/00478* (2013.01); *H04N 19/00763* (2013.01); *H04N 19/00278* (2013.01)
USPC .......................................... 382/238; 382/239

(58) Field of Classification Search
None
See application file for complete search history.

(56) References Cited

U.S. PATENT DOCUMENTS

| | | | |
|---|---|---|---|
| 6,571,016 B1 | 5/2003 | Mehrotra et al. | |
| 7,499,492 B1* | 3/2009 | Ameres et al. | 375/240.12 |
| 2006/0013498 A1* | 1/2006 | Kim et al. | 382/250 |
| 2007/0002945 A1* | 1/2007 | Kim | 375/240 |
| 2008/0219576 A1* | 9/2008 | Jung et al. | 382/238 |
| 2008/0310507 A1* | 12/2008 | Ye et al. | 375/240.12 |
| 2010/0002943 A1* | 1/2010 | Moon et al. | 382/233 |
| 2010/0061645 A1 | 3/2010 | Wilkins et al. | |
| 2010/0074333 A1* | 3/2010 | Au et al. | 375/240.12 |
| 2010/0135389 A1* | 6/2010 | Tanizawa et al. | 375/240.12 |

OTHER PUBLICATIONS

Jongho Kim; Jechang Jeong, "Fast intra-mode decision in H. 264 video coding using simple directional masks", (Jul. 12, 2005), Visual Communications and Image Processing 2005.*
Peng Zhang; Debin Zhao; Siwei Ma; Yan Lu; Wen Gao, "Multiple modes intra-prediction in intra coding", (Jun. 30, 2004), In Multimedia and Expo, 2004. ICME'04. 2004 IEEE International Conference on, vol. 1, pp. 419-422.*
Prediction of Intra Macroblocsk, http://www.vcodex.com/files/h264_intrapred.pdf, Apr. 2003, p. 1-6.
Johannes Balle, Intra Prediction Using The MRF Image Model, http://itg32.hhi.de/docs/ITG32_RWTH_08_1_192.pdf, Jun. 27, 2008, RWTH Aachen University, p. 1-19.

* cited by examiner

*Primary Examiner* — Atiba O Fitzpatrick
*Assistant Examiner* — Carol Wang
(74) *Attorney, Agent, or Firm* — Gregory J. Koerner; Redwood Patent Law

(57) ABSTRACT

A system and method for effectively performing an intra prediction procedure with an electronic device includes an encoder that utilizes a delta value comparison procedure to identify optimal delta values for creating optimal predicted blocks of image data corresponding to original blocks of image data. The encoder then utilizes the original blocks and the optimal predicted blocks to generate residual blocks that represent the original blocks in an encoded format. The encoder then generates a bitstream containing the delta value information and the residual block for storage or transmission purposes. A decoder may decode the delta values and the residual block to reconstruct the image block.

12 Claims, 9 Drawing Sheets

SYSTEM AND METHOD FOR EFFECTIVELY PERFORMING AN INTRA PREDICTION PROCEDURE

BACKGROUND SECTION

1. Field of the Invention

This invention relates generally to techniques for processing image data, and relates more particularly to a system and method for effectively performing an intra prediction procedure.

2. Description of the Background Art

Implementing effective methods for processing image data is a significant consideration for designers and manufacturers of contemporary electronic systems. However, effectively processing image data may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced image processing operations may provide additional benefits to a system user, but may also place increased demands on the control and management of various system components. For example, an enhanced electronic system that effectively performs advanced image encoding and decoding procedures may benefit from an efficient implementation because of the large amount and complexity of the digital data involved.

Due to growing demands on system resources and substantially increasing data magnitudes, it is apparent that developing new techniques for performing image processing is a matter of concern for related electronic technologies. Therefore, for all the foregoing reasons, developing effective systems for processing image data remains a significant consideration for designers, manufacturers, and users of contemporary electronic systems.

SUMMARY

In accordance with the present invention, a system and method are disclosed for effectively performing an intra prediction procedure. In accordance with one embodiment of the present invention, an encoder or other appropriate entity initially partitions a frame of video data into original blocks, and then selects a current original block for encoding. The encoder determines the best prediction mode for creating a predicted block corresponding to the current original block. The encoder then creates an optimal predicted block by performing delta value comparison procedures to identify optimal delta values for populating the optimized predicted block.

For example, in a top-vector prediction mode, the encoder accesses a current row of pixels from the current original block. Then the encoder performs a delta comparison procedure with a delta comparison window to compute similarity for all supported delta values. The delta values represent the amount of displacement shift of the delta comparison window.

The encoder identifies the delta value associated with the best similarity as the optimal delta value for that particular row. The encoder then similarly calculates the remaining optimal delta values for any remaining block rows. Once each row of the block has an optimal delta value, then the encoder utilizes the optimal delta values to populate the current predicted block.

Next, the encoder utilizes the current original block and the current predicted block to calculate a corresponding residual block. In a similar manner, the encoder proceeds to encode the remaining original blocks to produce an encoded frame of video data. For all of the foregoing reasons, the present invention therefore provides an improved system and method for effectively performing an intra prediction procedure with an electronic device.

DETAILED DESCRIPTION

The present invention relates to an improvement in image processing systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively performing an intra prediction procedure with an electronic device, and may include an encoder that utilizes a delta value comparison procedure to identify optimal delta values for creating optimal predicted blocks of image data corresponding to original blocks of image data. The encoder then utilizes the original blocks and the optimal predicted blocks to generate residual blocks that represent the original blocks in an encoded format.

Figure 1:
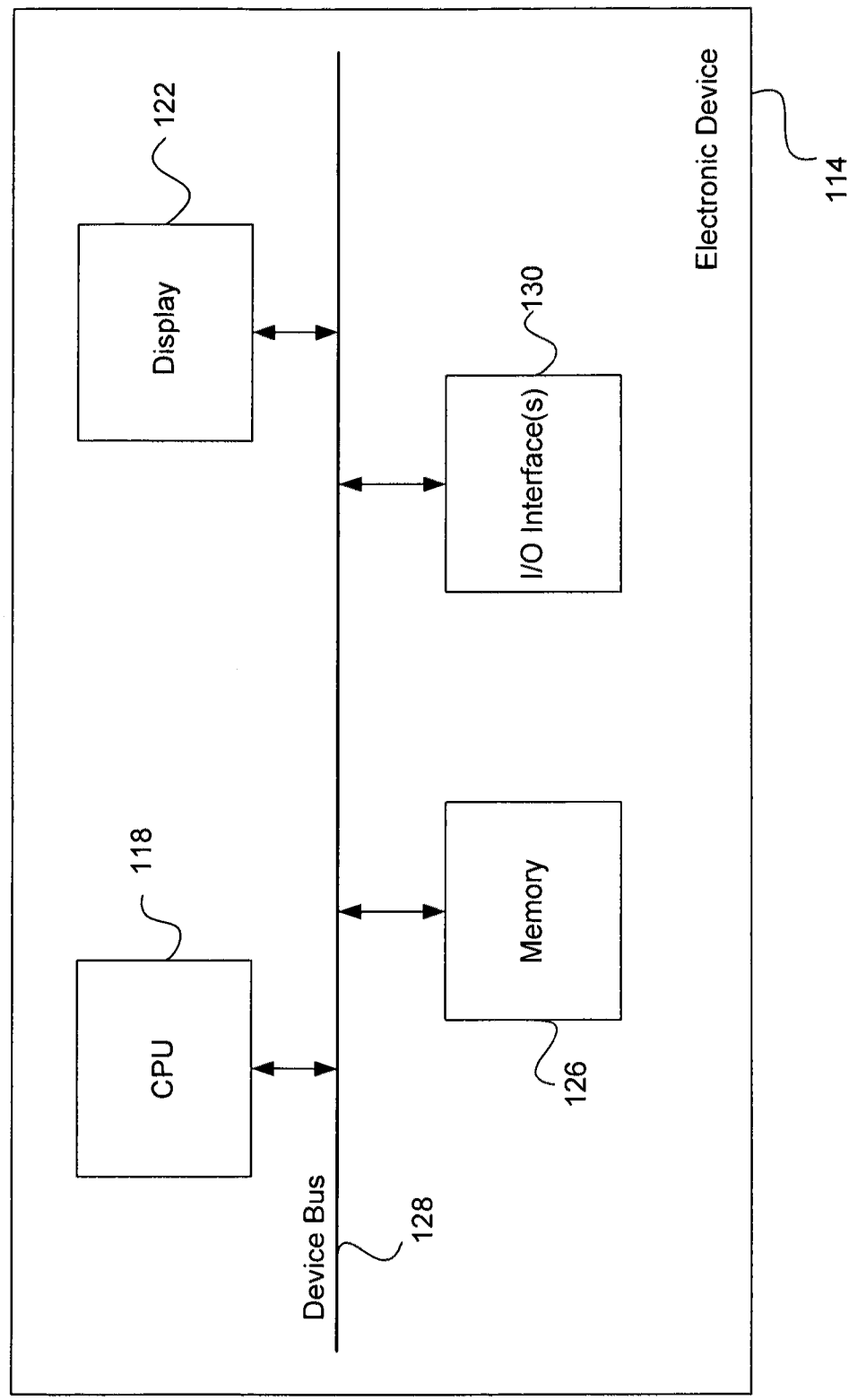
FIG. 1 is a block diagram of an electronic device, in accordance with one embodiment of the present invention.

Referring now to FIG. 1, a block diagram for one embodiment of an electronic device 114 is shown, in accordance with the present invention. In the FIG. 1 embodiment, electronic device 114 may include, but is not limited to, a central processing unit (CPU) 118, a display 122, a memory 126, and input/output interfaces (I/O interfaces) 130. Selected ones of the foregoing components of electronic device 114 may be coupled to, and communicate through, a device bus 128. In alternate embodiments, electronic device 114 may be implemented using components and configurations in addition to, or instead of, certain of those components and configurations discussed in conjunction with the FIG. 1 embodiment. In addition, electronic device 114 may alternately be implemented as any other desired type of electronic device or entity. For example, electronic device 114 may be implemented as a digital camcorder or a personal computer.

In the FIG. 1 embodiment, CPU 118 may be implemented to include any appropriate and compatible microprocessor device that executes software instructions to thereby control and manage the operation of electronic device 114. The FIG. 1 embodiment, display 122 may include any effective type of display technology including a cathode-ray-tube monitor or a liquid-crystal display device with an appropriate screen for displaying various information to a device user.

In the FIG. 1 embodiment, memory 126 may be implemented to include any combination of desired storage devices, including, but not limited to, read-only memory (ROM), random-access memory (RAM), and various types of non-volatile memory, such as floppy disks or hard disks. The contents and functionality of memory 126 are further discussed below in conjunction with FIG. 2. In the FIG. 1 embodiment, I/O interfaces 130 may include one or more input and/or output interfaces to receive and/or transmit any required types of information for electronic device 114. Additional details regarding the implementation and utilization of electronic device 114 are further discussed below in conjunction with FIGS. 2 through 9.

Figure 2:
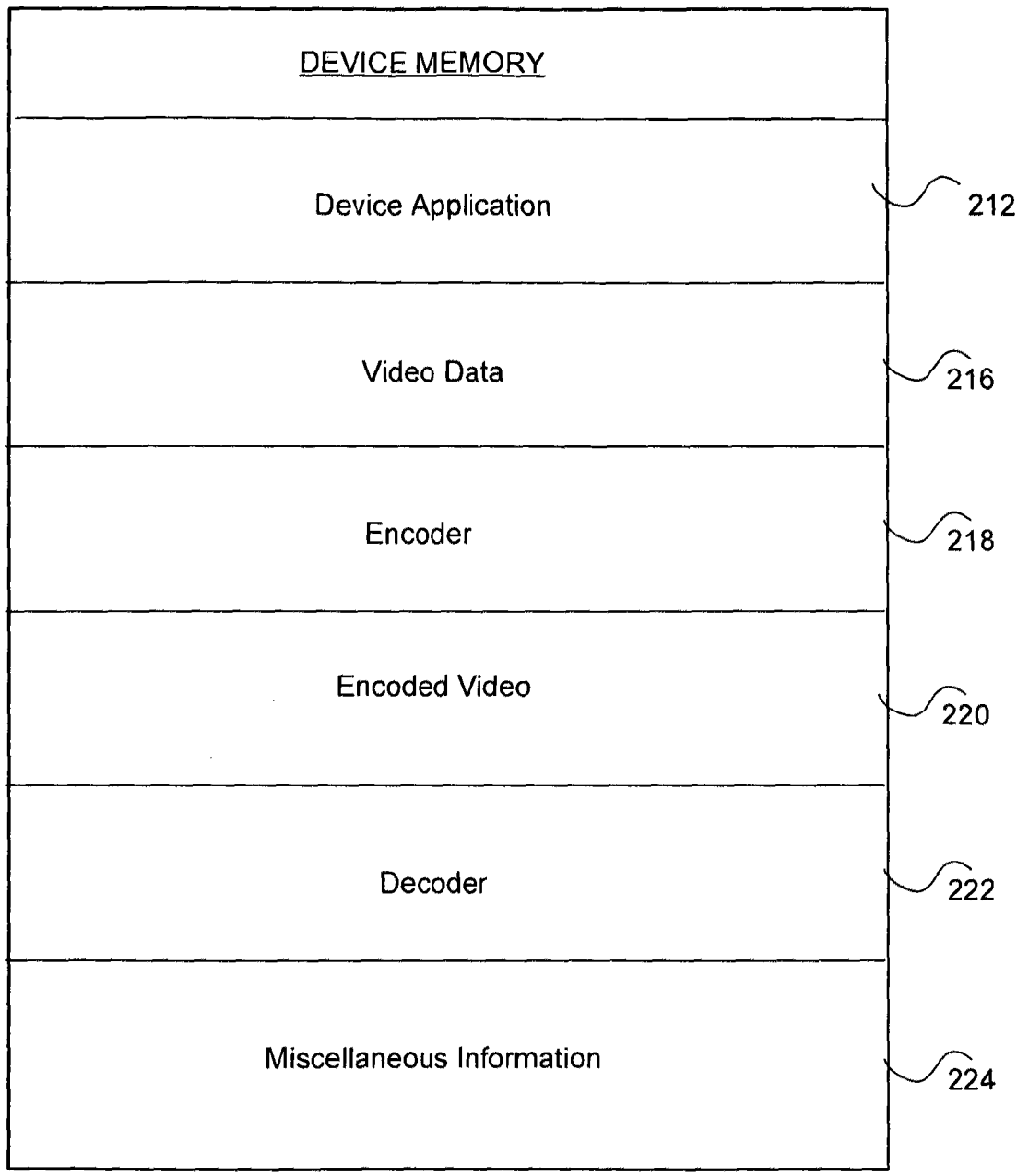
FIG. 2 is a block diagram for one embodiment of the device memory of FIG. 1, in accordance with the present invention.

Referring now to FIG. 2, a block diagram for one embodiment of the FIG. 1 memory 126 is shown, in accordance with the present invention. In the FIG. 2 embodiment, memory 126 includes, but is not limited to, a device application 212, video data 216, an encoder 218, encoded video 220, a decoder 222, and miscellaneous information 224. In alternate embodiments, memory 126 may include components and functionalities in addition to, or instead of, certain of those components and functionalities discussed in conjunction with the FIG. 2 embodiment.

In the FIG. 2 embodiment, device application 212 may include program instructions that are preferably executed by CPU 118 (FIG. 1) to perform various functions and operations for electronic device 114. The particular nature and functionality of device application 212 typically varies depending upon factors such as the specific type and particular functionality of the corresponding electronic device 114. In the FIG. 2 embodiment, encoder 218 may perform an encoding procedure on frames of video data 216 (or other image data) to produce encoded video 220 (or other encoded image data) by utilizing any effective techniques or methods. In certain embodiments, encoder 218 may utilize selected techniques that are similar to certain enhancements of an Advanced Video Coding (AVC) protocol.

In the FIG. 2 embodiment, decoder 222 may perform a decoding procedure on the encoded video 220 to reproduce the original frames of video data 216 by utilizing any effective techniques or methods. In alternate embodiments, decoder 222 may readily be implemented in devices or systems that are not integral with electronic device 114. In the FIG. 2 embodiment, miscellaneous information 224 may include any type of other data or software instructions for use by electronic device 114.

In the FIG. 2 embodiment, the present invention is disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein. Additional details regarding the implementation and utilization of encoder 218 and decoder 222 are further discussed below in conjunction with FIGS. 3 through 9.

Figure 3:
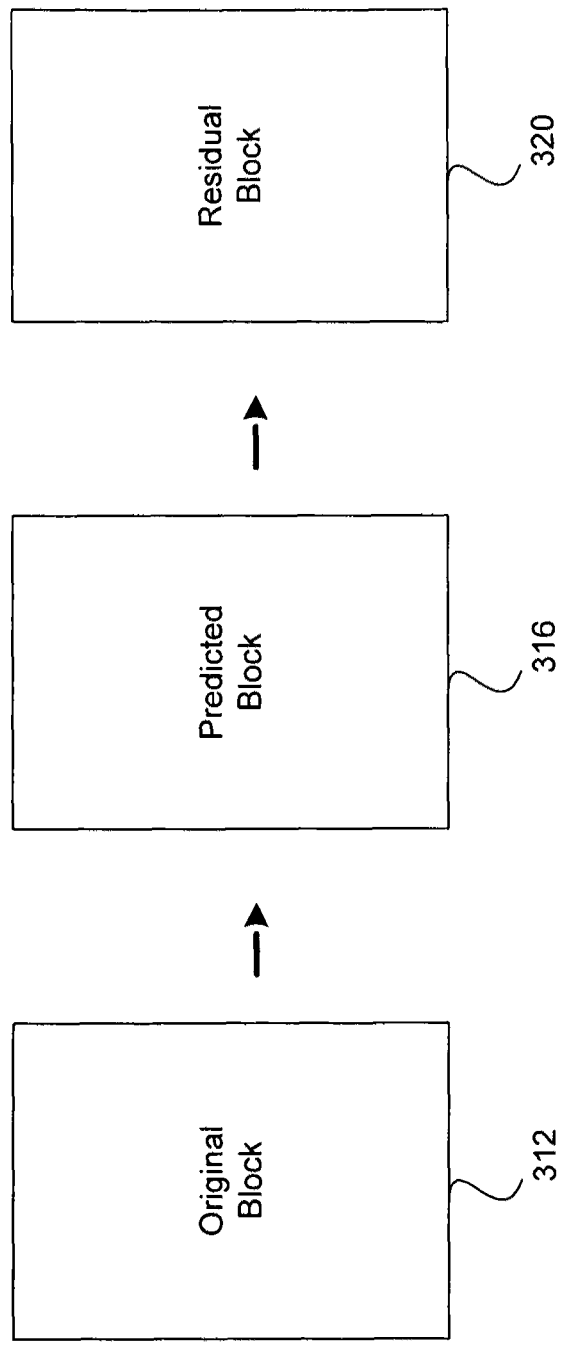
FIG. 3 is a diagram for utilizing a predicted block to generate a residual block of image data, in accordance with one embodiment of the present invention.

Referring now to FIG. 3, a diagram for utilizing a predicted block 316 to generate a residual block 320 of image data is shown, in accordance with one embodiment of the present invention. The FIG. 3 embodiment is presented for purposes of illustration, and in alternate embodiments, residual blocks 320 may be generated using techniques in addition to, or instead of, certain of those techniques discussed in conjunction with the FIG. 3 embodiment.

In accordance with certain embodiments of the present invention, encoder 218 (FIG. 2) or other appropriate entity initially partitions a current frame into a series of original blocks 312 of any appropriate dimensions. For example, in certain embodiments, an original block 312 may be configured with a height of four pixels and a width of four pixels. In the FIG. 3 embodiment, encoder 218 may then encode the original blocks 213 sequentially in a left-to-right, top-to-bottom raster sequence.

In the FIG. 3 embodiment, encoder 312 creates a predicted block 316 based upon information derived from the pixels of previously-encoded neighboring blocks. Encoder 312 may then compute the difference between original block 312 and predicted block 316 to thereby produce a residual block 320 that is an encoded version of original block 312. An important goal of this encoding procedure is therefore to create a predicted block 316 that is as close as possible to original block 312 because then residual block 320 may be efficiently encoded with a minimum number of digital bits. Additional details regarding the generation and utilization of predicted block 316 are further discussed below in conjunction with FIGS. 4 through 9.

Figure 4:
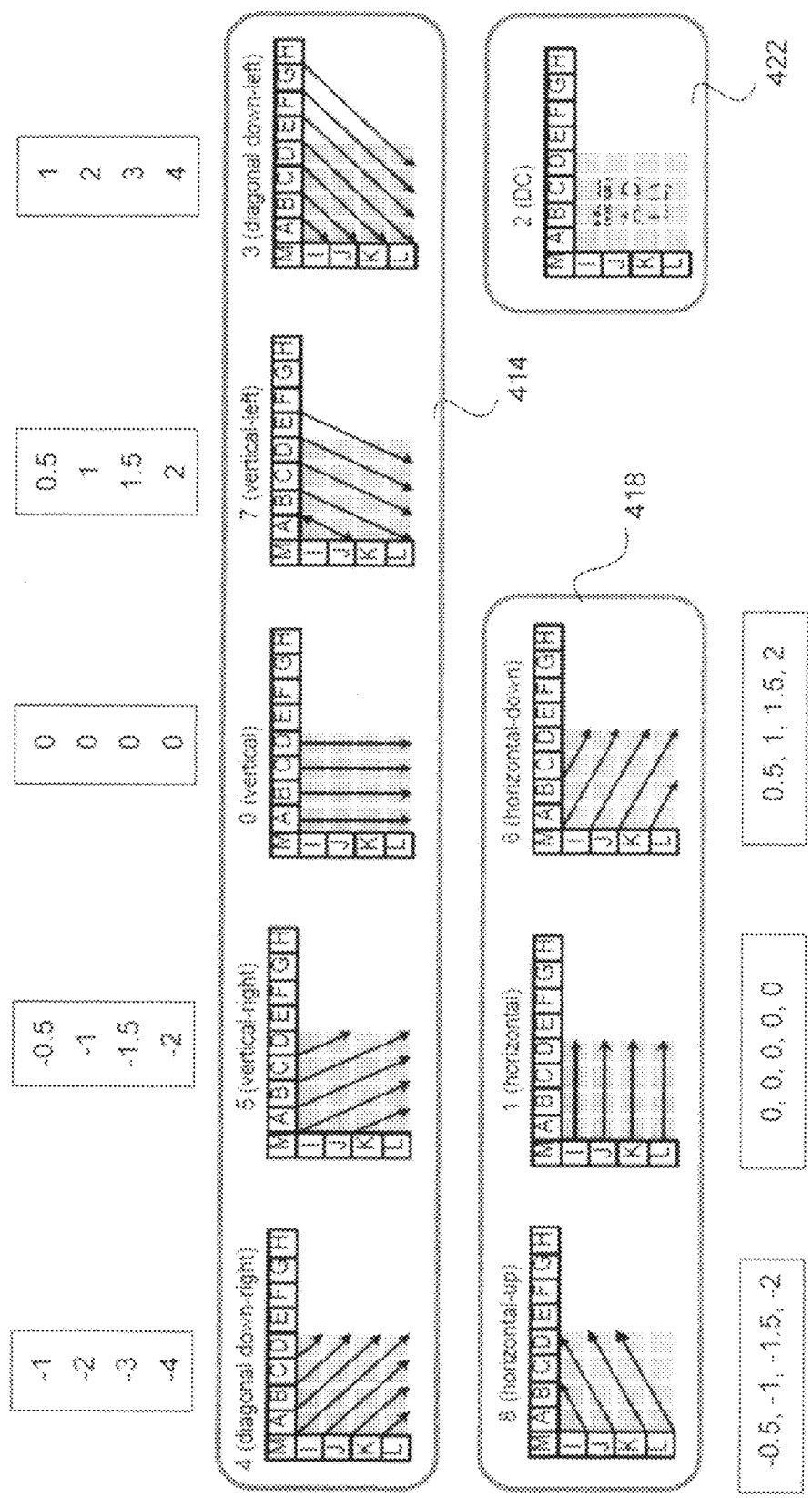
FIG. 4 is a diagram of various prediction modes for producing the predicted block of FIG. 3, in accordance with one embodiment of the present invention.

Referring now to FIG. 4, a diagram of various prediction modes for producing the FIG. 3 predicted block 316 is shown, in accordance with one embodiment of the present invention. The FIG. 4 embodiment is presented for purposes of illustration, and in alternate embodiments, predicted blocks 316 may be generated using techniques in addition to, or instead of, certain of those techniques discussed in conjunction with the FIG. 4 embodiment.

In the FIG. 4 embodiment, five top-vector prediction modes 414 and three left-vector prediction modes 418 are depicted. In addition, a DC mode 422 is shown that uses mean pixel values to create predicted block 316. In each of the FIG. 4 examples, a predicted block 316 with a four-by-four pixel array is populated with neighboring pixels from previously-encoded blocks 312. For example, in the top-vector prediction modes 414, the neighboring pixels include M, A, B, C, D, E, F, G, and H. In the left-vector prediction modes 418, the neighboring pixels include M, I, J, K, and L.

In the FIG. 4 embodiment, encoder 218 calculates predicted blocks 316 with each of the seven vector prediction modes 414 and 418 to determine which prediction mode will produce a predicted block 316 that is most similar to original block 312. In the FIG. 4 embodiment, each vector prediction mode 414 and 418 is shown with a corresponding set of four default delta values that are defined by the basic vector modes. For example, a vertical-left mode (number 7) is shown with delta values of 0.5, 1, 1.5, and 2 that are arranged vertically to indicate that the delta values each correspond to a different row of predicted block 316.

In the FIG. 4 embodiment of the vertical-left mode, delta value 0.5 corresponds to the top row of predicted block 316, delta value 1 corresponds to the second row of predicted block 316, delta value 1.5 corresponds to the third row of predicted block 316, and delta value 2 corresponds to the bottom row of predicted block 316. Additional details regarding the generation and utilization of delta values are further discussed below in conjunction with FIGS. 5 through 9.

Figure 5:
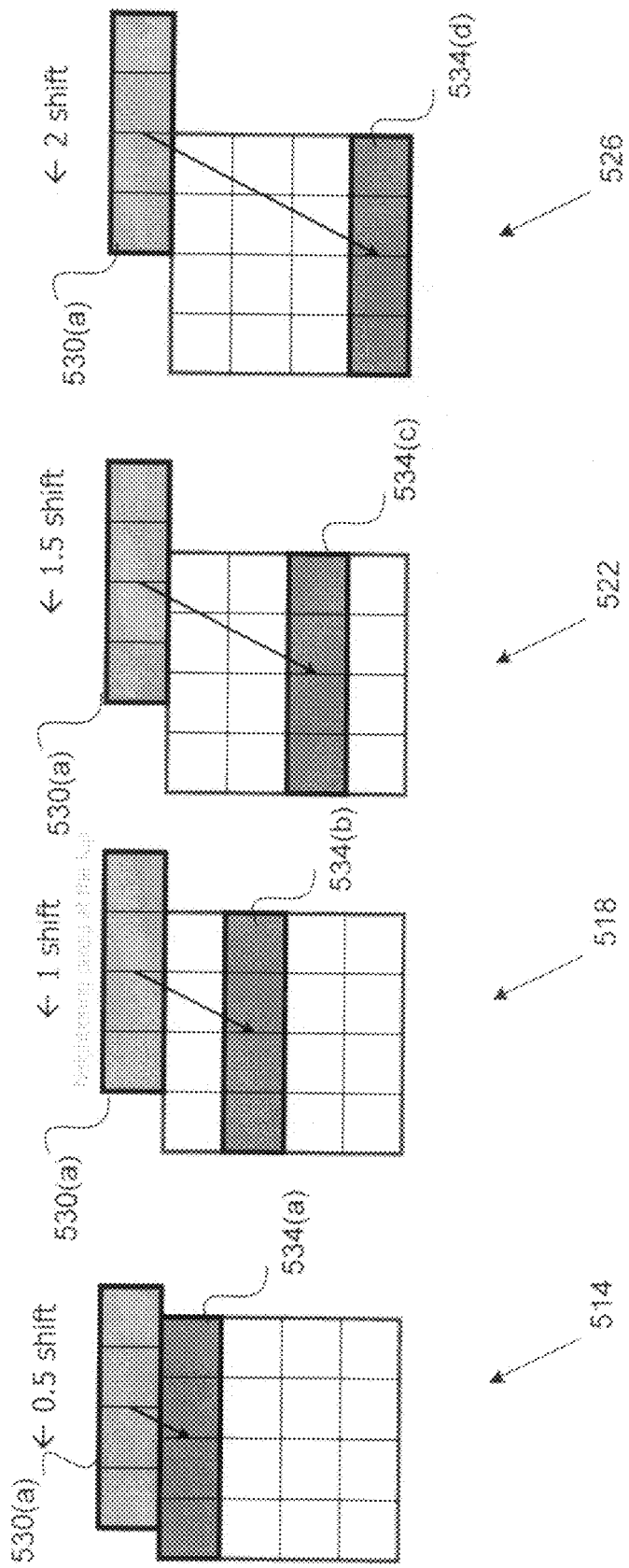
FIG. 5 is a diagram illustrating delta values for generating the predicted block of FIG. 3, in accordance with one embodiment of the present invention.

Referring now to FIG. 5, a diagram illustrating delta values for generating the FIG. 3 predicted block 316 is shown, in accordance with one embodiment of the present invention. The FIG. 5 embodiment is presented for purposes of illustration, and in alternate embodiments, predicted blocks 316 may be generated using techniques in addition to, or instead of, certain of those techniques discussed in conjunction with the FIG. 5 embodiment.

In FIG. 5, the vertical-left prediction mode of FIG. 4 is utilized as an example for illustrating the displacement shifts that result when sequentially populating the respective rows of predicted block 316 with the default delta values of FIG. 4. Example 514 shows a delta value of 0.5 being applied to shift four upper neighboring pixels 530(a) for populating a top row 534(a) of a predicted block 316 (FIG. 3). Note that when a delta value is a non-integer number (here, 0.5), a pixel value interpolation calculation is performed to correctly populate each of the corresponding pixels in that row of predicted block 316. For example, with a delta value of 0.5, the top left pixel of row 534(a) in predicted block 316 would be equal to the average of the two left-most pixels from neighboring pixels 530(a). The example uses linear interpolation, however any type of interpolation method is allowed.

In the FIG. 5 embodiment, example 518 shows a delta value of 1 being applied to shift four upper neighboring pixels 530(a) for populating a second row 534(b) of predicted block 316. Example 522 shows a delta value of 1.5 being applied to shift four upper neighboring pixels 530(a) for populating a third row 534(c) of predicted block 316. Example 526 shows a delta value of 2 being applied to shift four upper neighboring pixels 530(a) for populating a bottom row 534(d) of predicted block 316. Encoder 218 (FIG. 2) may therefore apply different delta values to separately encode individual rows of predicted block 316.

The FIG. 5 examples utilize a top-vector prediction mode 414 (FIG. 4). In a left-vector prediction mode 418 (FIG. 4), encoder 218 may sequentially encode vertical columns from left to right by utilizing delta values in a similar manner. Additional details regarding the generation and utilization of predicted block 316 are further discussed below in conjunction with FIGS. 6 through 9.

Figure 6:
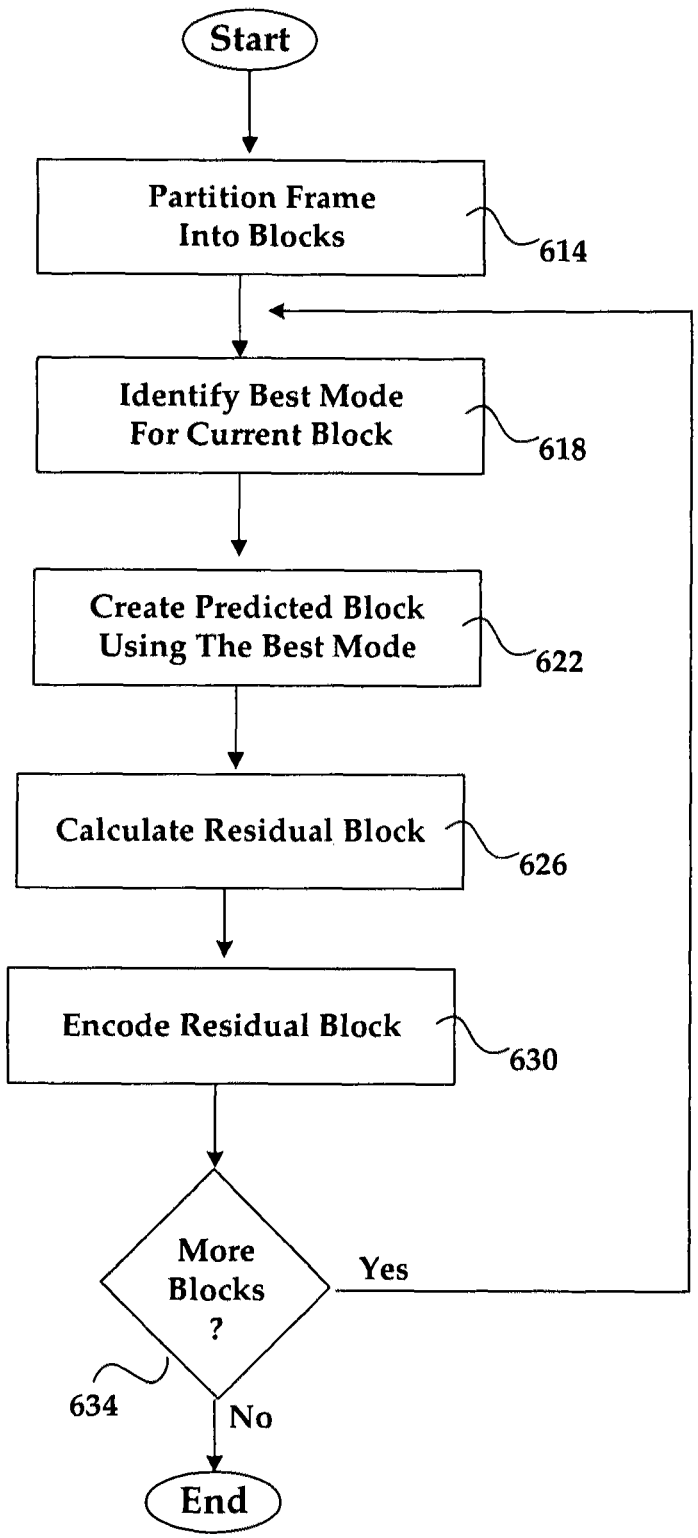
FIG. 6 is a flowchart of method steps for encoding a frame of image data, in accordance with one embodiment of the present invention.

Referring now to FIG. 6, a flowchart of method steps for encoding a frame of image data is shown, in accordance with one embodiment of the present invention. The FIG. 6 example is presented for purposes of illustration, and in alternate embodiments, the present invention may utilize steps and sequences in addition to, or instead of, certain of those steps and sequences discussed in conjunction with the FIG. 6 embodiment.

In step 614 of the FIG. 6 embodiment, an encoder 218 or other appropriate entity initially partitions a frame of video data 216 into original blocks 312, and then selects a current original block 312 for encoding. In step 618, the encoder 218 determines the best prediction mode for creating a predicted block 316 corresponding to the current original block 312. In the FIG. 6 embodiment, the encoder 218 typically tries all prediction modes, and identifies the optimal prediction mode as the prediction mode that produces a predicted block 316 with the highest degree of similarity to the corresponding original block 312.

In step 622, the encoder 218 then creates an optimized predicted block 316 by performing delta value comparison procedures to identify optimal delta values for populating the optimized predicted block 316. In step 626, the encoder 218 utilizes the original block 312 and the predicted block 316 to calculate a corresponding residual block 320. In step 630, the encoder 218 then encodes the residual block 630. In step 634, the encoder 218 determines whether additional original blocks 312 remain to be encoded. If additional original blocks 312 remain, then the FIG. 6 procedure returns to step 618 to encode the remaining original blocks 312. However, if no additional original blocks remain, then the entire frame of video data 216 has been encoded, and the FIG. 6 process may terminate.

Figure 7A:
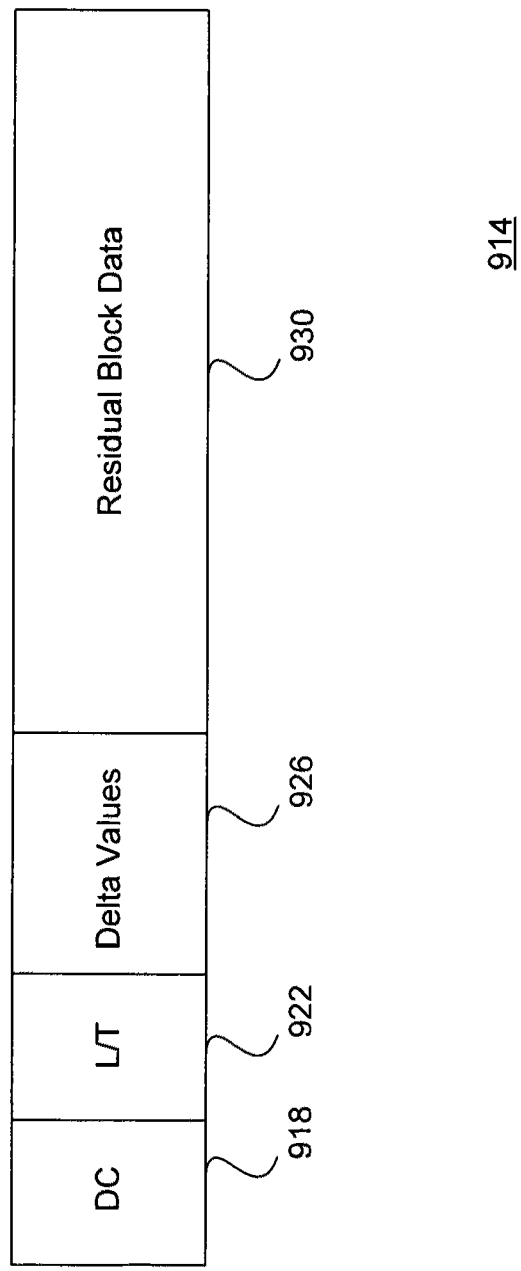
FIG. 7A is a diagram of an encoded bitstream, in accordance with one embodiment of the present invention.

Referring now to FIG. 7A, a diagram illustrating an encoded bitstream 914 is shown, in accordance with one embodiment of the present invention. The FIG. 7A embodiment is presented for purposes of illustration, and in alternate embodiments, encoded bitstreams 914 may be implemented using elements and configurations in addition to, or instead of, certain of those elements and configurations discussed in conjunction with the FIG. 7A embodiment.

In the FIG. 7A embodiment, encoded bitstream 914 includes a DC mode field 918 that indicates whether a DC mode (FIG. 4) was utilized. Encoded bitstream 914 also includes a left/top mode field to indicate whether a top-vector mode 414 or a left-vector mode 418 (FIG. 4) was used. Encoded bitstream 914 further includes optimal delta values 926, as discussed below in conjunction with FIGS. 7B and 8. Finally, encoded bitstream 914 includes the processed and encoded residual block data 930, as discussed above in conjunction with FIGS. 3 and 6. The residual block may be transformed, quantized, and entropy coded to further reduce data rate. In accordance with the present invention, encoder 218 therefore need not transmit or store any type of mode identifier because the optimal delta values may be utilized by decoder 222 to effectively decode the residual block data 930.

In certain embodiments, the present invention may utilize several methods for encoding the delta values. The goal is to transmit the displacement vector $[\Delta_1 \Delta_2 \ldots \Delta_N]$ to the decoder. For simplicity of notation, let $\Delta_0=0$. Redundancy among the $\Delta$ Values can be utilized through either extrapolation or interpolation.

For extrapolation:
First signal $\Delta_1$
Then for n=2, ..., N, signal $\Delta_n - 2\Delta_{n-1} + \Delta_{n-2}$
i.e., $\Delta_n$ is predicted from extrapolation of $\Delta_{n-1}$ and $\Delta_{n-2}$
For interpolation (use N=8 as an example):
First signal $\Delta_8$
Then signal $\Delta_4 - 0.5(\Delta_0 + \Delta_8)$,
Then signal $\Delta_6 - 0.5(\Delta_4 + \Delta_8)$ and $\Delta_2 - 0.5(\Delta_0 + \Delta_4)$
Then signal $\Delta_n - 0.5(\Delta_{n-1} + \Delta_{n+1})$ for n=1, 3, 5, 7
i.e., each $\Delta$ value is predicted from interpolation of its previous and future neighbors that are available In either case, the first number to be signaled ($\Delta_1$ or $\Delta_8$) can be predicted from other blocks.

Figure 7B:
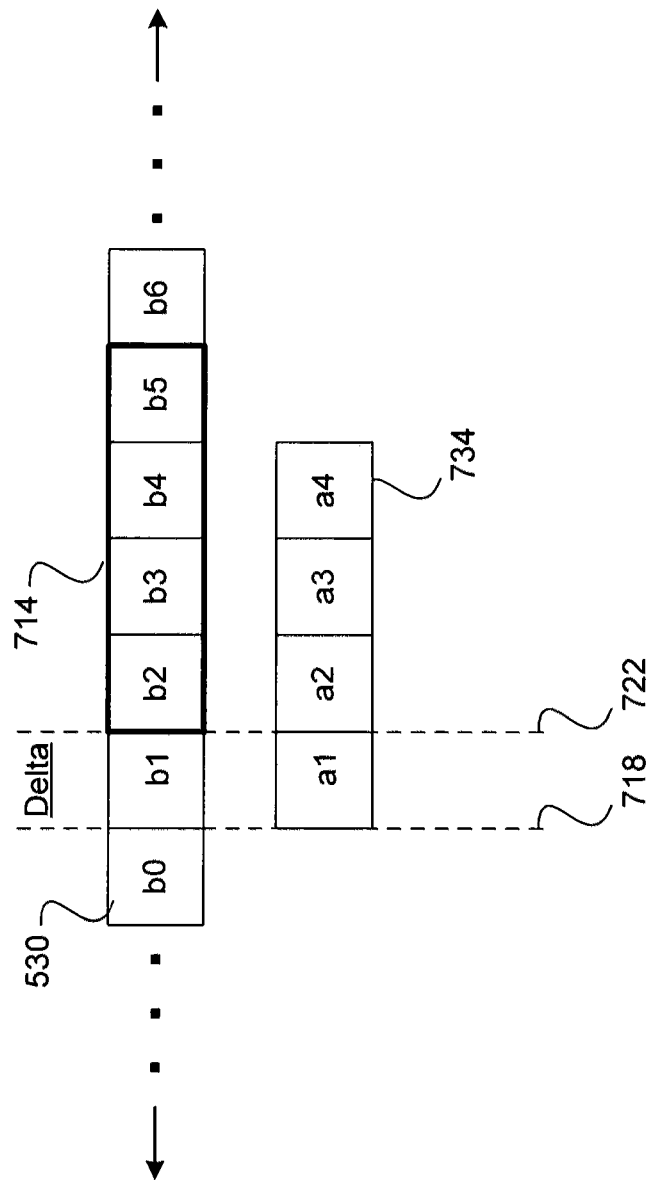
FIG. 7B is a diagram illustrating a moveable delta selection window for generating optimal delta values, in accordance with one embodiment of the present invention.

Referring now to FIG. 7B, a diagram illustrating a moveable delta comparison window 714 for generating optimal delta values is shown, in accordance with one embodiment of the present invention. In the FIG. 7B example, delta comparison window 714 is shown as a rectangle having a bolded black perimeter that is superimposed over a row 530 of upper neighboring pixels to include pixels b2, b3, b4, and b5. The FIG. 7B example is presented for purposes of illustration, and in alternate embodiments, delta values may be generated using techniques in addition to, or instead of, certain of those techniques discussed in conjunction with the FIG. 7B embodiment.

In the FIG. 7B embodiment, encoder 218 (FIG. 2) performs delta value comparison procedures by incrementally moving delta comparison window 714 along the row of neighboring pixels 530, and then calculating a comparison delta value for the pixels encompassed by delta comparison window 714 at each position of the delta comparison window 714. Encoder 218 may then identify an optimal delta value from among the comparison delta values for populating a row 534 of an optimized predicted block 316 by choosing the comparison delta value that produces the greatest similarity between a row 734 of the original block 312 (FIG. 3) and the pixels inside of delta comparison window 714.

For purposes of illustration, the FIG. 7B example utilizes a top-vector prediction mode (FIG. 4). However, the present invention may readily utilize any vector prediction mode including, but not limited to, a left-vector prediction mode shown in FIG. 4. If a left-vector prediction mode 418 is utilized, then the FIG. 7B example would be rotated ninety degrees counter-clockwise, and the delta comparison window 714 would move up and down in a vertical direction. In certain embodiments, the present invention may incrementally evaluate comparison delta values by searching around the default delta values shown in FIG. 4.

For purposes of illustration, the FIG. 7B example shows delta comparison window 714 positioned with a delta value of 1 as shown between axis 718 and axis 722. In accordance with the present invention, any desired integer or non-integer delta value is possible for delta values. For example, delta comparison window 714 may be moved in increments of 0.25 pixels along neighboring row 530. As discussed above in conjunction with FIG. 5, when a delta value is a non-integer number, a pixel value interpolation calculation is performed to combine neighboring pixels according to their percentage of contribution for populating corresponding pixels in the row of predicted block 316.

In the FIG. 7B embodiment, encoder 218 may select the optimal delta value in any effective manner. For example, encoder 218 may quantify the degree of similarity between the neighboring pixels in delta comparison window 714 and the pixels in row 734 by calculating a Sum of Absolute Differences (SAD) value that sums the absolute values of the differences between each of the corresponding pixels from row 734 and delta comparison window 714. For example, in the FIG. 7B example, pixel a1 corresponds to pixel b2, pixel a2 corresponds to pixel b3, pixel a3 corresponds to pixel b4, and pixel a4 corresponds to pixel b5.

In certain embodiments, the SAD value may be expressed by the following formula.

$$SAD_n = \sum_{j=1}^{N} |a_{nj} - b_{j-\Delta_n}|$$

where "n" is the index of the current row, "j" represents respective pixel locations in the current row, "a" represents pixel values from row 734 of original block 312, "b" represents pixel values from a neighboring row 530, and "$\Delta_n$" is a current delta value. In this case [$\Delta_1$ $\Delta_2$ ... $\Delta_N$] can be optimized independently.

In certain embodiments, a joint rate-distortion measure may be utilized to measure the said similarity. In the joint-rate distortion measure technique, for row n, The Lagrangian cost to use Δn is denoted as:

$$J_n = SAD_n + \lambda R_n$$

where $R_n$ is the number of bits used to signal $\Delta_n$, which may obtained by using the methods in discussed above in conjunction with FIG. 7A, and λ is the Lagrangian multiplier. The goal is to find the optimum [$\Delta_1$ $\Delta_2$ ... $\Delta_N$] to minimize $J_1$ + ... + $J_N$. A joint optimization is needed, because $\Delta_n$ can be predicted from each other. To reduce complexity, a greedy approach can be used. Using interpolation as example, first find $\Delta_N$ to minimize $J_N$. Then find $\Delta_{N/2}$ to minimize $J_{N/2}$, and so forth. Additional details regarding the generation and utilization of delta values are further discussed below in conjunction with FIG. 8.

Figure 8:
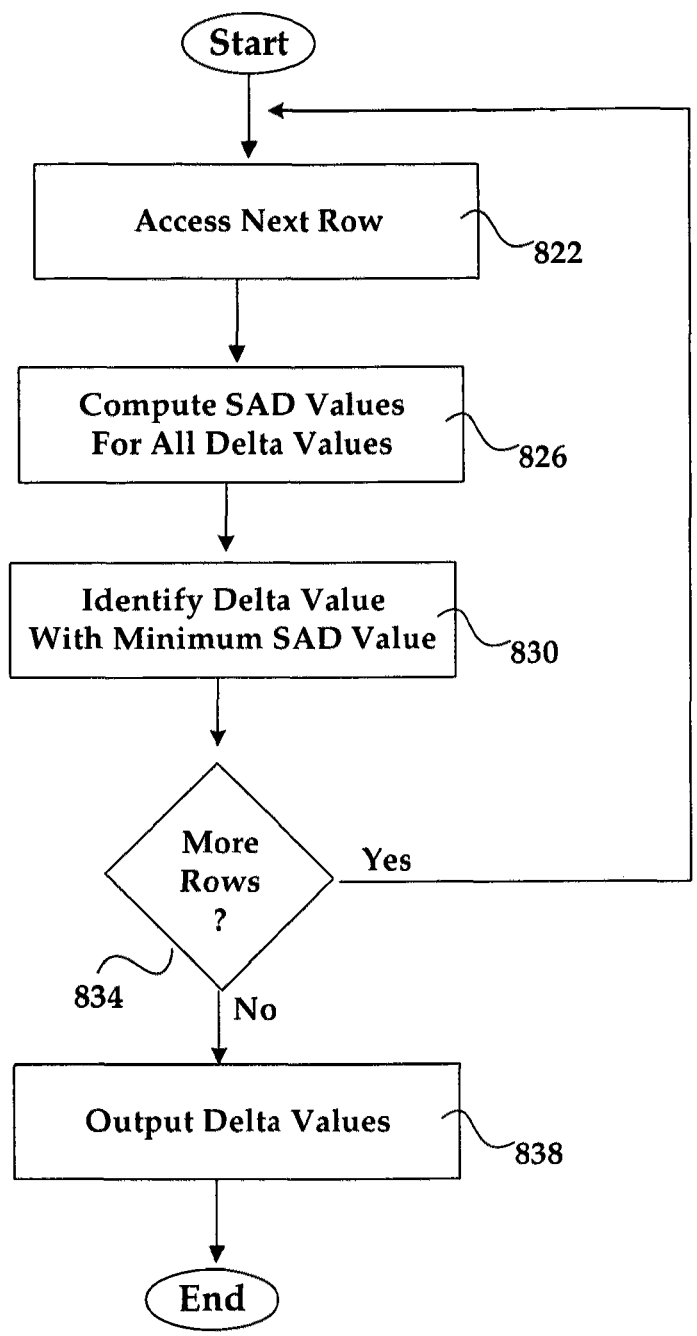
FIG. 8 is a flowchart of method steps for generating delta values for a predicted block, in accordance with one embodiment of the present invention.

Referring now to FIG. 8, a flowchart of method steps for generating delta values for a predicted block 316 is shown, in accordance with one embodiment of the present invention. The FIG. 8 example is presented for purposes of illustration, and in alternate embodiments, the present invention may utilize steps and sequences in addition to, or instead of, certain of those steps and sequences discussed in conjunction with the FIG. 8 embodiment.

In the FIG. 8 embodiment, in step 822, an encoder 218 or other appropriate entity accesses a current row of pixels from an original block 312. Then in step 826, the encoder 218 performs a delta comparison procedure with a delta comparison window 714 to compute the similarity for all supported delta values, as discussed above in conjunction with FIG. 7. In step 830, the encoder 218 identifies the delta value associated with the best similarity as the optimal delta value.

In step 834, the encoder 218 determines whether any rows of the current block remain without a corresponding optimal delta value. If any rows still require an optimal delta value, then the FIG. 8 process returns to step 822 to calculate the remaining optimal delta values. Once each row of the block has an optimal delta value, then the encoder 218 outputs the optimal delta values, and the FIG. 8 process terminates. For all of the foregoing reasons, the present invention thus provides an effective system and method for performing an intra prediction procedure.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an intra prediction procedure with an electronic device, comprising:

an encoder that utilizes a delta value comparison procedure to create predicted blocks of image data based upon original blocks of image data, said encoder then utilizing said original blocks and said predicted blocks to generate residual blocks that represent said original blocks, said encoder forming a bitstream that contains the delta values and the residual values for storage or transmission purposes;

a processor that controls said encoder to perform said intra prediction procedure; and a decoder that decodes said bitstream and reconstructs image blocks, said encoder initially partitioning a frame of said image data into said original blocks, said encoder then selecting a current original block, said encoder determining an optimal prediction mode for creating a current predicted block by trying all available prediction modes, said prediction modes including top-vector prediction modes and left-vector prediction modes, each of said prediction modes have predefined default delta values, said encoder utilizing said optimal prediction mode to create said current predicted block, said encoder populating said current predicted block on a row-by-row basis for top-vector prediction modes, said encoder populating said current predicted block on a column-by-column basis for left-vector prediction modes, said encoder separately calculating comparison delta values for each block row in said top-vector prediction mode, said encoder alternately calculating said comparison delta values for each block column in said left-vector prediction mode, said comparison delta values representing positions of a delta comparison window with respect to neighboring pixels from previously encoded blocks of said image data.

2. The system of claim 1 wherein said encoder selects an optimal delta value from among said comparison delta values to represent a maximum degree of similarity between said neighboring pixels in said delta comparison window and a current row of a current original block.

3. The system of claim 2 wherein said encoder estimates the similarity for each of said comparison delta values, said optimal delta value having the best of said similarity.

4. The system of claim 3 wherein said similarity may be estimated using sum of absolute difference values in said top-vector mode which are calculated according to a formula:

$$SAD_n = \sum_{j=1}^{N} |a_{nj} - b_{j-\Delta_n}|$$

where SAD represents said sum of absolute difference values, n is the index of the current row, "j" represents respective pixel locations in the current row, "a" represents pixel values from an original block row of said current original block, "b" represents pixel values from a neighboring row, and "$\Delta_n$" is a delta value of the current row.

5. The system of claim 3 wherein said similarity may be rate-distortion cost which is calculated according to a formula in said top-vector mode:

$$J_n = SAD_n + \lambda R_n$$

where Rn is the bit-rate to encode $\Delta$n and $\lambda$ is the Lagrangian multiplier.

6. The system of claim 5 wherein said best similarity is to find $[\Delta_1 \Delta_2 \ldots \Delta_N]$ that minimizes $J_1 + \ldots + J_N$.

7. The system of claim 5 wherein said bit-rate to encode the delta values depends on a method of encoding that includes at least one of an extrapolation method and an interpolation method, said extrapolation method being performed by utilizing the following steps:
    First signal $\Delta_1$
    Then for n=2, ..., N, signal $\Delta_n - 2\Delta_{n-1} + \Delta_{n-2}$
    That is, $\Delta_n$ is predicted from extrapolation of $\Delta_{n-1}$ and $\Delta_{n-2}$
said interpolation method, using N=8 as an example, being performed by utilizing the following steps:
    First signal $\Delta_8$
    Then signal $\Delta_4 - 0.5(\Delta_0 + \Delta_8)$,
    Then signal $\Delta_6 - 0.5(\Delta_4 + \Delta_8)$ and $\Delta_2 - 0.5(\Delta_0 + \Delta_4)$
    Then signal $\Delta_n - 0.5(\Delta_{n-1} + \Delta_{n+1})$ for n=1, 3, 5, 7
    That is, each $\Delta$ value is predicted from interpolation of its previous and future neighbors that are available
so that in said extrapolation method and said interpolation method, the first number to be signaled ($\Delta_1$ or $\Delta_8$) is predicted from other blocks.

8. The system of claim 6 wherein the joint optimization of $(\Delta_1, \ldots, \Delta_n)$ is simplified by utilizing a greedy approach.

9. The system of claim 3 wherein said encoder moves said delta comparison window in any integer or non-integer increments with respect to predefined default delta values of said prediction modes.

10. The system of claim 5 wherein said encoder stores optimal delta values for each block row together with respective ones of said residual blocks into an encoded bitstream for storage or transmission purposes.

11. The system of claim 10 wherein a decoder device utilizes said optimal delta values to decode said respective ones of said residual blocks.

12. The system of claim 10 wherein said encoded bitstream contains no mode indicator to specify a particular one of said prediction modes.

* * * * *